US010005454B2

(12) United States Patent
Matsumura et al.

(10) Patent No.: US 10,005,454 B2
(45) Date of Patent: Jun. 26, 2018

(54) HYBRID VEHICLE

(71) Applicant: Toyota Jidosha Kabushiki Kaisha, Toyota-shi, Aichi-ken (JP)

(72) Inventors: Mitsuhiro Matsumura, Toyota (JP); Takeshi Kishimoto, Nagakute (JP); Masaya Amano, Toyota (JP); Takashi Ando, Nisshin (JP); Yu Shimizu, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/274,230

(22) Filed: Sep. 23, 2016

(65) Prior Publication Data

US 2017/0088127 A1    Mar. 30, 2017

(30) Foreign Application Priority Data

Sep. 25, 2015 (JP) ................................ 2015-188496

(51) Int. Cl.
*B60W 20/50* (2016.01)
*B60W 10/06* (2006.01)
(Continued)

(52) U.S. Cl.
CPC ............... *B60W 20/50* (2013.01); *B60K 6/28* (2013.01); *B60K 6/445* (2013.01); *B60L 11/02* (2013.01); *B60L 15/007* (2013.01); *B60W 10/06* (2013.01); *B60W 10/08* (2013.01); *H02P 29/60* (2016.02); *B60K 6/26* (2013.01); *B60K 6/365* (2013.01); *B60L 2210/30* (2013.01); *B60W 2510/081* (2013.01); *B60W 2510/087* (2013.01); *B60W 2710/081* (2013.01); *B60W 2710/105* (2013.01); (Continued)

(58) Field of Classification Search
CPC ...... B60W 10/06; B60W 10/08; B60W 20/50; B60W 20/10; B60W 20/15; B60W 2510/087
See application file for complete search history.

(56) References Cited

U.S. PATENT DOCUMENTS 9,555,799 B2 *  1/2017  Hayakawa ............ B60W 10/06
9,707,957 B2 *  7/2017  Shimizu ................ B60W 20/50
(Continued)

FOREIGN PATENT DOCUMENTS

JP          2013-203116 A     10/2013

*Primary Examiner* — Ramya P Burgess
*Assistant Examiner* — David R Morris
(74) *Attorney, Agent, or Firm* — Dinsmore & Shohl LLP (57) ABSTRACT

When at least one of motor generators is not under normal control and where the MG1 temperature is less than an upper limit value, an ECU is configured to perform an inverter-less running control. In the inverter-less running control, an inverter is brought into a gate shutoff state and an engine is driven to cause the motor generator to generate a counter-electromotive voltage which consequently produces a counter-electromotive torque. During the inverter-less running control, the ECU makes a voltage difference between the counter-electromotive voltage and the voltage of a power line connecting a converter and an inverter when the MG1 temperature is equal to or greater than a predetermined value smaller than the voltage difference when the MG1 temperature is less than the predetermined value.

3 Claims, 10 Drawing Sheets

(51) Int. Cl.
  *B60W 10/08* (2006.01)
  *H02P 29/60* (2016.01)
  *B60K 6/28* (2007.10)
  *B60L 11/02* (2006.01)
  *B60L 15/00* (2006.01)
  *B60K 6/445* (2007.10)
  *B60K 6/26* (2007.10)
  *B60K 6/365* (2007.10)
  *H02P 3/14* (2006.01)

(52) U.S. Cl.
  CPC ....... *B60Y 2200/92* (2013.01); *B60Y 2300/66* (2013.01); *H02P 3/14* (2013.01); *Y10S 903/906* (2013.01); *Y10S 903/91* (2013.01)

(56) References Cited

U.S. PATENT DOCUMENTS

| | | | |
|---|---|---|---|
| 2015/0258986 A1* | 9/2015 | Hayakawa | B60W 10/06 701/22 |
| 2017/0088125 A1* | 3/2017 | Shimizu | B60W 20/50 |
| 2017/0106852 A1* | 4/2017 | Ando | B60W 20/10 |
| 2017/0113678 A1* | 4/2017 | Oba | B60K 6/26 |
| 2017/0113680 A1* | 4/2017 | Shimizu | B60K 6/26 |
| 2017/0120891 A1* | 5/2017 | Kishimoto | B60W 20/13 |

* cited by examiner

HYBRID VEHICLE

CROSS-REFERENCE TO RELATED APPLICATIONS

This non-provisional application claims priority to Japanese Patent Application No. 2015-188496 filed on Sep. 25, 2015 with the Japan Patent Office, the entire contents of which are hereby incorporated by reference.

BACKGROUND

Technical Field

The present disclosure relates to a hybrid vehicle, and more specifically relates to a hybrid vehicle capable of running by using at least one of the motive power from an engine and the motive power from a rotating electrical machine.

Description of the Background Art

It is known that a hybrid vehicle is provided with an engine, a first motor generator, a second motor generator, and a planetary gear mechanism. The planetary gear mechanism includes a sun gear coupled to the first motor generator, a ring gear coupled to the second motor generator, and a carrier coupled to the engine.

The electrical system of the hybrid vehicle includes a battery, a converter and an inverter. The converter is configured to boost a voltage input from the battery and output the boosted voltage. The inverter is electrically connected between the converter and the first rotating electrical machine, and is configured to perform a bidirectional power conversion between the battery and the first motor generator and between the battery and the second motor generator.

In the hybrid vehicle having such a configuration, when a malfunction occurs in the inverter so that the first and second motor generators cannot be controlled or driven to rotate normally, an appropriate action is required to take so as to protect devices. For example, Japanese Patent Laying-Open No. 2013-203116 discloses that a control is performed to bring the inverter into a gate shutoff state when a malfunction is detected in the inverter.

SUMMARY

As disclosed in Japanese Patent Laying-Open No. 2013-203116, when a malfunction occurs in the inverter, the inverter is brought into a gate shutoff state and the engine is controlled to drive the vehicle to run under a limp-home mode, this kind of control will be referred to as "inverter-less running control" in the present specification.

In the inverter-less running control, while the inverter is being brought into the gate shutoff state, the first motor generator is mechanically rotated by the rotational force from the engine, and thereby generates a counter-electromotive voltage. Accordingly, the first motor generator generates a counter-electromotive torque (braking torque) which acts in a direction to prevent the first motor generator from rotating. Due to the action of the counter-electromotive torque from the first motor generator on the sun gear, a drive torque is generated in the ring gear acting in a positive direction as a reaction of the counter-electromotive torque from the first motor generator. Owing to the drive torque, the limp-home mode is achieved.

During the inverter-less running control, electrical power is constantly generated in the first motor generator, and due to the heat generated in the first motor generator, the temperature of the first motor generator will rise. If the temperature of the first motor generator rises excessively, the inverter-less running should be interrupted so as to protect the first motor generator. Thus, in the inverter-less running, due to the heat generation in the first motor generator, the available inverter-less running distance (i.e. the limp-home running distance) may be shortened.

The present disclosure has been accomplished in view of the aforementioned problems, and it is therefore an object of the present disclosure to provide a hybrid vehicle capable of performing an inverter-less running control with a technique to elongate the limp-home running distance.

The hybrid vehicle according to an aspect of the present disclosure is provided with an engine, a first rotating electrical machine including a rotor provided with a permanent magnet, an output shaft coupled to drive wheels, a planetary gear mechanism mechanically coupled to the engine, the first rotating electrical machine and the output shaft, and configured to transmit torque among the engine, the first rotating electrical machine and the output shaft, a second rotating electrical machine coupled to the output shaft, a battery, a converter configured to boost a voltage from the battery and output the boosted voltage, an inverter configured to perform a power conversion between the converter and the first rotating electrical machine and between the converter and the second rotating electrical machine, and a control device configured to perform an inverter-less running control when at least one of the first rotating electrical machine and the second rotating electrical machine not under normal control and when the temperature of the first rotating electrical machine is less than a first predetermined value The inverter-less running control is such a control that the inverter is brought into a gate shutoff state, and the engine is driven to cause the first rotating electrical machine to generate a braking torque due to a counter-electromotive voltage generated by the first rotating electrical machine, and thereby causing the vehicle to run with a torque which acts on the output shaft as a counterforce of the braking torque. During the inverter-less running control, the control device is configured to set a voltage difference between the electromotive voltage and the voltage of a power line connecting a converter and an inverter to a first voltage difference when the temperature of the first rotating electrical machine is equal to or greater than a second predetermined value which is smaller than the first predetermined value, and set the voltage difference to a second voltage difference when the temperature of the first rotating electrical machine is less than the second predetermined value. The first voltage difference is smaller than the second voltage difference.

According to the above configuration, when the temperature of the first rotating electrical machine is equal to or greater than the second predetermined value, in comparison with the case where the temperature of the first rotating electrical machine is less than the second predetermined value, the voltage difference is made smaller, and thereby, the current flowing from the first rotating electrical machine into the battery is reduced. In other words, since the electric power generated by the first rotating electrical machine is reduced, the Joule heat (calorific heat) generated by the first rotating electrical machine is reduced. Thus, the temperature of the first rotating electrical machine is prevented from rising excessively. As a result, the temperature of the first rotating electrical machine is kept below the first predetermined value, which makes it possible to elongate the limp-home running distance by the hybrid vehicle.

In some embodiments, the control device reduces the voltage difference by controlling the converter to increase the voltage of the power line.

In general, compared with the control on the rotation speed of a rotating electrical machine, the control on the output voltage of a converter can be performed with high accuracy. Therefore, according to the above configuration, compared with the control on the rotation speed of the first rotating electrical machine (to be described later), the engine is controlled so as to control the current flowing from the first rotating electrical machine to the battery with high accuracy, thereby reducing the heat generation in the first rotating electrical machine.

In some embodiments, the control device includes a first control unit configured to detect a temperature of the first rotating electrical machine and control the engine, and a second control unit configured to control the converter. When the inverter-less running control is performed and when a communication malfunction is present between the first control unit and the second control unit, the first control unit is configured to reduce the voltage difference by controlling the engine to reduce a rotation speed of the first rotating electrical machine from a first rotation speed to a second rotation speed, the first rotation speed being a speed when the temperature of the first rotating electrical machine is equal to or greater than the second predetermined value, the second rotation speed being a speed when the temperature of the first rotating machine is less than the second predetermined value.

In the configuration where the first control unit for controlling the engine and the second control unit for controlling the converter are provided separately, when a communication malfunction occurs between the first control unit and the second control unit, a boosting instruction for the converter cannot be transmitted from the first control unit to the second control unit. Therefore, it is impossible for the second control unit to control the converter so as to adjust the heat generation in the first rotating electrical machine. According to the above configuration, even when such a communication malfunction occurs, it is possible that the first control unit controls the engine so as to reduce the heat generation in the first rotating electrical machine.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Hereinafter, embodiments of the present disclosure will be described in detail with reference to the accompanying drawings. It should be noted that the same or equivalent portions in the drawings will be denoted by the same reference signs, and the description thereof will not be repeated.

First Embodiment

Overall Configuration of a Hybrid Vehicle

Figure 1:
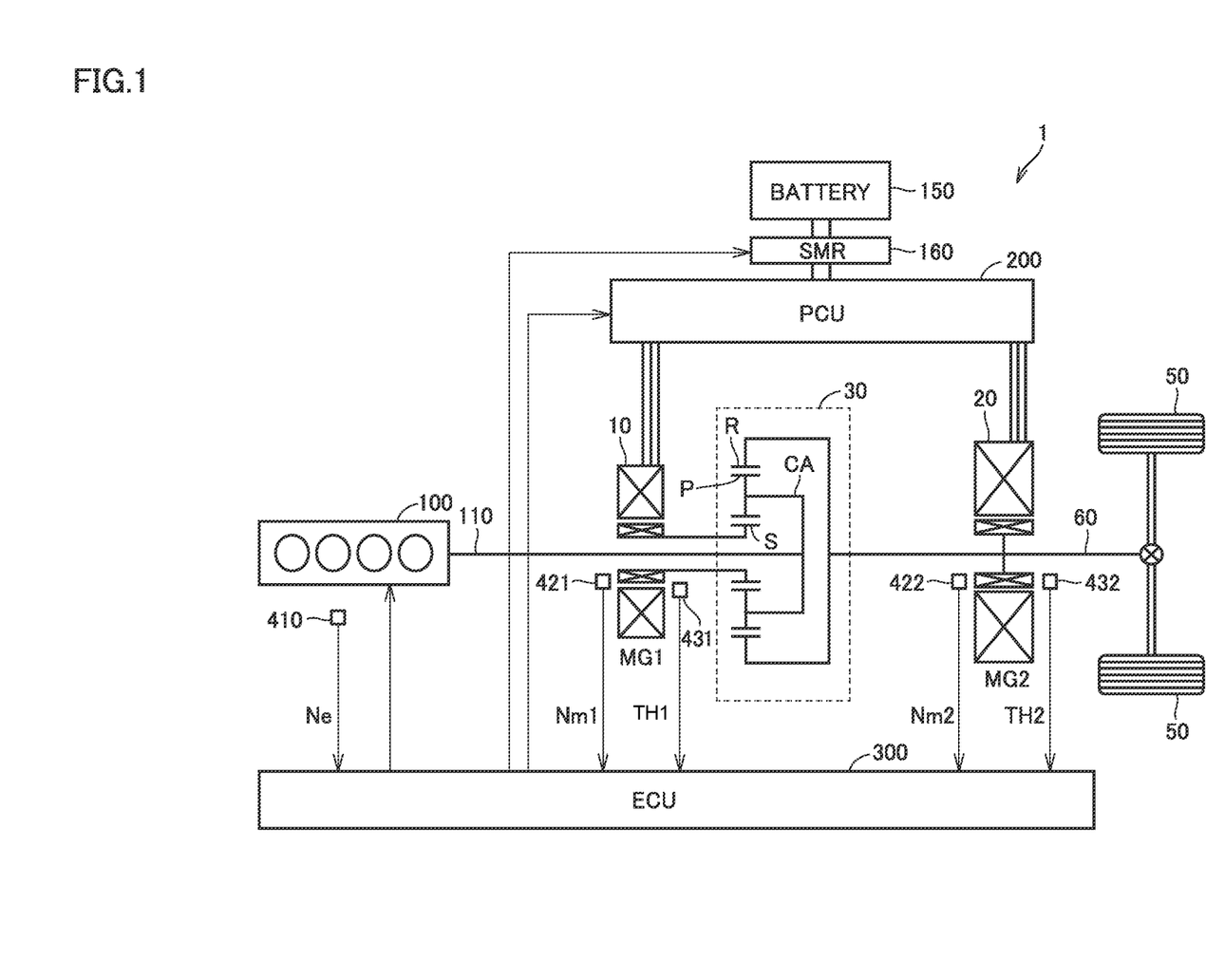
FIG. 1 is a block diagram schematically illustrating the overall configuration of a hybrid vehicle according to a first embodiment of the present disclosure.

FIG. 1 is a block diagram schematically illustrating the overall configuration of a hybrid vehicle according to a first embodiment of the present disclosure. With reference to FIG. 1, vehicle 1 includes an engine 100, a motor generator 10, a motor generator 20, a planetary gear mechanism 30, drive wheels 50, an output shaft 60 coupled to drive wheels 50, a battery 150, a system main relay (SMR) 160, a power control unit (PCU) 200, and an electronic control unit (ECU) 300.

Vehicle 1 is configured to move by using at least one of the motive power from engine 100 and the motive power from motor generator 20. In normal running which will be described later, vehicle 1 can switch the running mode between an electrical vehicle running mode in which the vehicle is driven to run by using the motive power from motor generator 20 without using the motive power from engine 100 (hereinafter referred to as "EV running") and a hybrid vehicle running mode in which the vehicle is driven to run by using both the motive power from engine 100 and the motive power from motor generator 20 (hereinafter referred to as "HV running").

Engine 100 is an internal combustion engine such as a gasoline engine or a diesel engine. Engine 100 is configured to generate the motive power for driving vehicle 1 to run in response to a control signal from ECU 300. The motive power generated by engine 100 is output to planetary gear mechanism 30.

Engine 100 is provided with an engine rotation speed sensor 410. Engine rotation speed sensor 410 is configured to detect a rotation speed (engine rotation speed) Ne of engine 100, and output a signal indicating the detection result to ECU 300.

Each of motor generators 10 and 20 is for example a three-phase AC permanent magnet synchronous motor. At the time of initiating engine 100, motor generator (first rotating electrical machine) 10 uses the motive power from battery 150 to rotate a crankshaft 110 of engine 100. Motor generator 10 can also generate AC power by using the motive power from engine 100. The AC power generated by motor generator 10 is converted into DC power by PCU 200 and charged into battery 150. The AC power generated by motor generator 10 may be supplied to motor generator 20.

The rotor of motor generator (second rotating electrical machine) 20 is coupled to output shaft 60. Motor generator 20 receives the electrical power supplied from at least one of battery 150 and motor generator 10 so as to rotate output shaft 60. Motor generator 20 can also generate AC power through regenerative braking. The AC power generated by motor generator 20 is converted into DC power by PCU 200 and charged into battery 150.

Motor generator 10 is provided with a resolver 421 and a temperature sensor 431. Resolver 421 is configured to detect a rotation speed Nm1 of motor generator 10 (hereinafter referred to as "MG1 rotation speed"), and output a signal indicating the detection result to ECU 300. Temperature sensor 431 is configured to detect a temperature TH1 of motor generator 10 (hereinafter referred to as "MG1 temperature"), and output a signal indicating the detection result to ECU 300.

Motor generator 20 is provided with a resolver 422 and a temperature sensor 432. Resolver 422 is configured to detect a rotation speed Nm2 of motor generator 20 (hereinafter referred to as "MG2 rotation speed"), and output a signal indicating the detection result to ECU 300. Temperature sensor 432 is configured to detect a temperature TH2 of motor generator 20 (hereinafter referred to as "MG2 temperature"), and output a signal indicating the detection result to ECU 300.

Planetary gear mechanism 30 is mechanically coupled to engine 100, motor generator 10 and output shaft 60, and is configured to transmit torque among engine 100, motor generator 10 and output shaft 60. Specifically, planetary gear mechanism 30 includes, as rotating elements, a sun gear S coupled to the rotor of motor generator 10, a ring gear R coupled to output shaft 60, a carrier CA coupled to crankshaft 110 of engine 100, and a pinion gear P meshing with sun gear S and ring gear R. Carrier CA is configured to hold pinion gear P in such a manner that pinion gear P is capable of rotating and revolving.

Battery 150 is a rechargeable power storage device. Typically, battery 150 is provided in a form of a secondary battery such as a lithium ion secondary battery or a nickel-hydrogen secondary battery, or a capacitor such as an electric double-layer capacitor.

SMR 160 is connected in series between battery 150 and PCU 200 via a power line. SMR 160 is configured to switch between a conducted state in which battery 150 and PCU 200 are conducted to each other and a disconnected state in which battery 150 and PCU 200 are disconnected from each other in response to a control signal from ECU 300.

PCU 200 boosts the voltage of the DC power stored in battery 150, converts the DC power with a boosted voltage into AC power and supplies the AC power to motor generator 10 and motor generator 20. Further, PCU 200 converts the AC power generated by motor generator 10 and motor generator 20 into DC power and supplies the DC power to battery 150. The configuration of PCU 200 will be described in detail with reference to FIG. 2.

ECU 300 is provided with a central processing unit (CPU), a memory, an input buffer and an output buffer or the like (none of them is illustrated in the drawings). ECU 300 controls various devices such that vehicle 1 runs in a desired running state in accordance with a signal from each of the sensors and instruments as well as a map and a program stored in the memory. Note that the various controls are not limited to be processed by software, and they may be processed by dedicated hardware (such as an electronic circuitry).

<Configuration of Electrical System and ECU>

Figure 2:
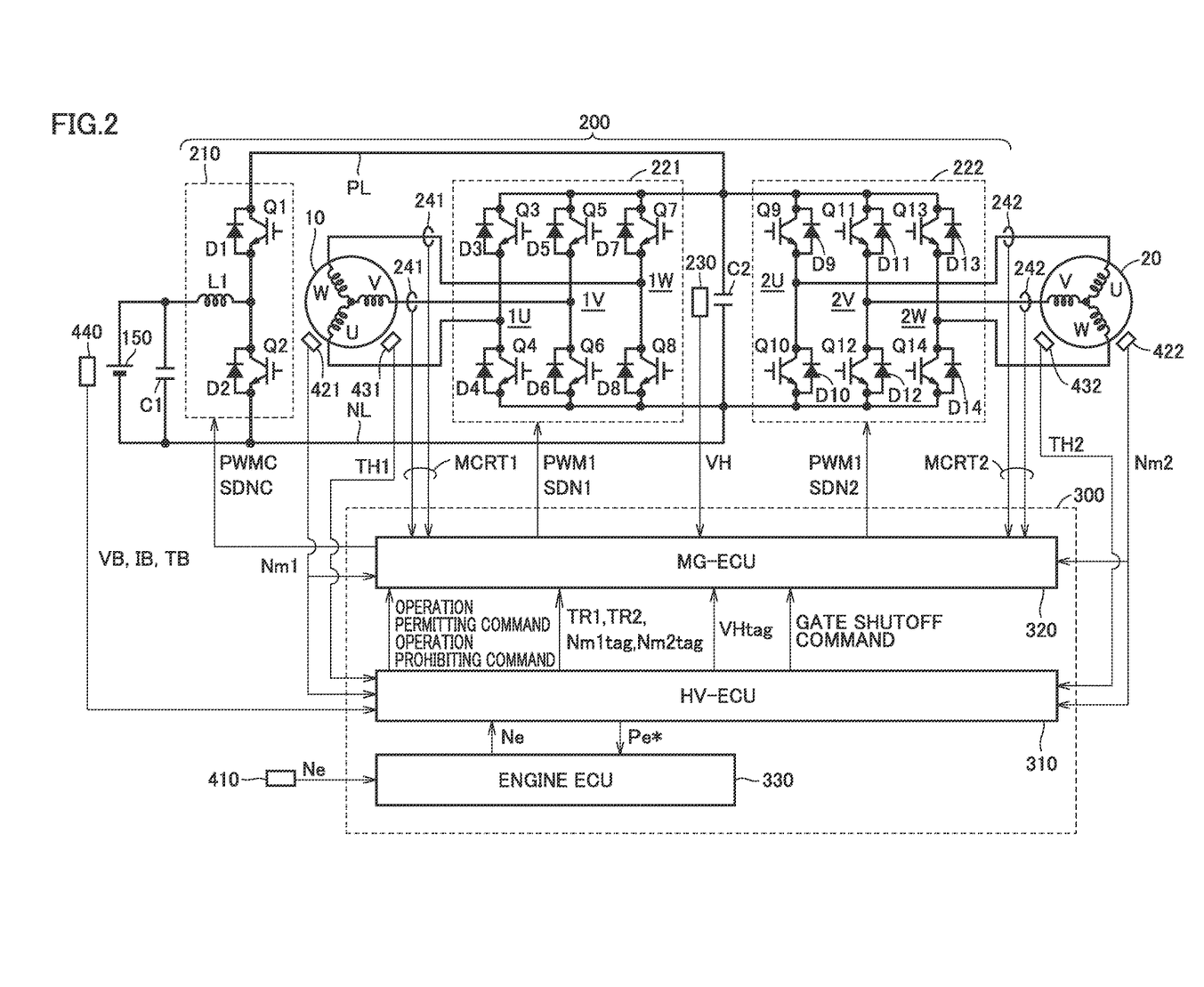
FIG. 2 is a circuit block diagram illustrating the configuration of an electrical system and an ECU of the hybrid vehicle.

FIG. 2 is a circuit block diagram for illustrating the configuration of an electrical system and ECU 300 of vehicle 1. PCU 200 includes a capacitor C1, a converter 210, a capacitor C2, inverters 221 and 222, a voltage sensor 230, and current sensors 241 and 242. ECU 300 includes an HV-ECU 310, an MG-ECU 320, and an engine ECU 330.

Battery 150 is provided with a monitor unit 440. Monitor unit 440 is configured to detect a voltage (battery voltage) VB of battery 150, a current (battery current) IB flowing through battery 150, a temperature (battery temperature) TB of battery 150, and output a signal indicating the respective detection result to HV-ECU 310.

Capacitor C1 is connected to battery 150 in parallel. Capacitor C1 is configured to smooth battery voltage VB and supply the smoothed voltage to converter 210.

Converter 210 is configured to boost battery voltage VB in response to a control signal from MG-ECU 320, and supply the boosted voltage to power lines PL and NL. In addition, converter 210 is also configured to step down the voltage of the DC power supplied from one or both of inverters 221 and 222 to power lines PL and NL in response to a control signal from MG-ECU 320 so as to charge battery 150.

More specifically, converter 210 includes a reactor L1, switching elements Q1 and Q2, and diodes D1 and D2. Each of switching elements Q1 and Q2 and switching elements Q3 to Q14 which will be described hereinafter is for example an insulated gate bipolar transistor (IGBT). Switching elements Q1 and Q2 are connected in series between power line PL and power line NL. Diode D1 is connected between a collector and an emitter of switching element Q1 in inverse parallel to switching element Q1, and diode D2 is connected between a collector and an emitter of switching element Q2 in inverse parallel to switching element Q2. One end of reactor L1 is connected to the high potential side of battery 150, and the other end of reactor L1 is connected to an intermediate point between switching elements Q1 and Q2 (i.e., the joining point between the emitter of switching element Q1 and the collector of switching element Q2).

Capacitor C2 is connected between power line PL and power line NL. Capacitor C2 is configured to smooth a DC voltage supplied from converter 210 and supply the smoothed voltage to inverters 221 and 222.

Voltage sensor 230 is configured to detect the voltage across capacitor C2, namely the voltage VU (hereinafter referred to as "system voltage") across power lines PL and NL connecting converter 210 and inverter 221, and output a signal indicating the detection result to MG-ECU 320.

As system voltage VH is supplied to inverter 221, inverter 221 converts the DC voltage into an AC voltage in response to a control signal from MG-ECU 320 so as to drive motor generator 10. Thus, motor generator 10 is driven to generate a torque specified by a torque command value TR1.

More specifically, inverter 221 includes a U-phase arm 1U, a V-phase arm 1V and a W-phase arm 1W. The 3 phase arms are connected in parallel to each other between power line PL and power line NL. U-phase arm 1U includes a switching element Q3 and a switching element Q4 which are connected in series to each other. V-phase arm 1V includes a switching element Q5 and a switching element Q6 which are connected in series to each other. W-phase arm 1W includes a switching element Q7 and a switching element Q8 which are connected in series to each other. Diode D3 is connected between a collector and an emitter of switching element Q3 in inverse parallel to switching element Q3. In the same way, diodes D4 to D8 are each connected between the collector and the emitter of each of switching elements Q4 to Q8 in inverse parallel to the corresponding switching element, respectively.

The intermediate point of each phase arm is connected to each phase coil of motor generator 10. Specifically, one ends of the three coils of motor generator 10, in other words, one end of the U-phase coil, one end of the V-phase coil and the W-phase coil are all connected to a neutral point. The other end of the U-phase coil is connected to the intermediate point of switching elements Q3 and Q4. The other end of the V-phase coil is connected to the intermediate point of switching elements Q5 and Q6. The other end of the W phase coil is connected to the intermediate point of switching elements Q7 and Q8. Since the configuration of inverter 222 is substantially equivalent to that of inverter 221, the description thereof will not be repeated.

Current sensor 241 is configured to detect a current (hereinafter referred to as "motor current") MCRT1 flowing through motor generator 10, and output a signal indicating the detection result to MG-ECU 320. Current sensor 242 is configured to detect a current (motor current) MCRT2 flowing through motor generator 20, and output a signal indicating the detection result to MG-ECU 320.

HV-ECU 310 receives a signal indicating MG1 temperature TH1 from temperature sensor 431 and a signal indicating MG2 temperature TH2 from temperature sensor 432. Further, HV-ECU 310 receives a signal indicating MG1 rotation speed Nm1 from resolver 421 and a signal indicating MG2 rotation speed Nm2 from resolver 422. The signals from temperature sensors 431 and 432 may be input to both HV-ECU 310 and MG-ECU 320.

HV-ECU 310 is configured to generate an operation command for controlling motor generators 10 and 20, and output the operation command to MG-ECU 320. The operation command for motor generators 10 and 20 may include an operation permitting command and/or an operation prohibiting command for controlling each of motor generators 10 and 20, a torque command value TR1 for controlling motor generator 10, a torque command value TR2 for controlling motor generator 20, a command value (hereinafter referred to as "MG1 target rotation speed") Nm1tag for controlling MG1 rotation speed Nm1, a command value (hereinafter referred to as "MG2 target rotation speed") Nm2tag for controlling MG2 rotation speed Nm2 and the like.

HV-ECU 310 is further configured to set a target output voltage (hereinafter referred to as "system target voltage") VHtag for converter 210, and output a signal indicating the value of the target output voltage to MG-ECU 320. HV-ECU 310 is further configured to determine an engine required power Pe*, and output a signal indicating the value of the engine required power to engine ECU 330.

MG-ECU 320 receives, from HV-ECU 310, the operation permitting command and the operation prohibiting command, each of the command values (TR1, TR2, Nm1tag, Nm2tag) mentioned in the above, and system target voltage VHtag for motor generators 10 and 20. Furthermore, MG-ECU 320 receives signals from the respective sensors. Specifically, ECU 320 receives signals indicating MG rotation speeds Nm1 and Nm2 from resolvers 421 and 422, a signal indicating system voltage VH from voltage sensor 230, and signals indicating motor currents MCRT1 and MCRT2 from current sensors 241 and 242, respectively.

MG-ECU 320, based on the operation commands, the command values and system target voltage VHtag as well as a variety of signals, controls converter 210 so as to make system voltage VH equal to system target voltage VHtag. More specifically, MG-ECU 320, based on system target voltage VHtag, battery voltage VB and system voltage VH, generates a PWM-type (Pulse Width Modulation) control signal PWMC so as to cause each of switching elements Q1 and Q2 to perform switching operations, and outputs the signal to converter 210. On the other hand, MG-ECU 320, when receiving a gate shutoff command of converter 210 from HV-ECU 310, generates a gate shutoff signal SDNC for shutting off respective switching elements Q1 and Q2, and outputs the signal to converter 210.

In addition, MG-ECU 320 controls inverters 221 and 222 to operate in accordance with an operation command received by motor generators 10 and 20 from HV-ECU 310. Since inverters 221 and 222 are controlled in the same manner, the control on inverter 221 will be described only. When receiving an operation permission command for motor generator 10 from HV-ECU 310, MG-ECU 320, based on system voltage VH, motor current MCRT1 and torque command value TR1, generates a PWM-type control signal PWM1 so as to cause each of switching elements Q3 to Q8 to perform switching operations, and outputs the signal to inverter 221. On the other hand, MG-ECU 320, when receiving a gate shutoff command of converter 210 from HV-ECU 310, generates a gate shutoff signal SDN1 for shutting off respective switching elements Q3 to Q8, and outputs the signal to inverter 221.

Engine ECU 330 receives engine rotation speed Ne from engine rotation speed sensor 410, and outputs the value to HV-ECU 310. Engine ECU 330 controls the fuel injection, the ignition timing, the valve timing and the like of engine 100 so as to make engine 100 operate under predetermined operating point (engine target rotation speed Netag and engine target torque Tetag) determined by HV-ECU 310 on the basis of engine required power Pe*.

In the example illustrated in FIG. 2, ECU 300 is divided into three units (HV-ECU 310, MG-ECU 320 and engine-ECU 330). However, the three units may be integrated into one unit. Alternately, ECU 300 may be divided into four units or more. Hereinafter, HV-ECU 310, MG-ECU 320 and engine-ECU 330 will be described as ECU 300 representatively when it is not necessary to distinguish the three units.

<Normal Mode and Limp-Home Mode>

ECU 300 can control vehicle 1 to run under either a normal mode or a limp-home mode. The normal mode refers to such one that vehicle 1 is driven to run while switching as required between the EV running and the HV running. In other words, the normal mode allows the electrical driving of motor generators 10 and 20 by respective inverters 221 and 222. Hereinafter, the running of vehicle 1 under the normal mode is simply described as "normal running".

The limp-home mode refers to such a mode that when a malfunction has occurred in any component among resolvers 421 and 422 or current sensors 241 and 242 or a communication malfunction has occurred among the three units of ECU 300, and thereby the electrical control of motor generators 10 and 20 by respective inverters 221 and 222 (hereinafter referred to as "inverter malfunction") cannot be performed normally, vehicle 1 is driven to perform the limp-home running by engine 100 while shutting off the respective gates of inverters 221 and 222. In other words, the limp-home mode prohibits the electrical driving of motor generators 10 and 20 by respective inverters 221 and 222. Hereinafter, the running under the limp-home mode will be described as "inverter-less running", and the control for performing the inverter-less running will be described as "inverter-less running control".

Figure 3:
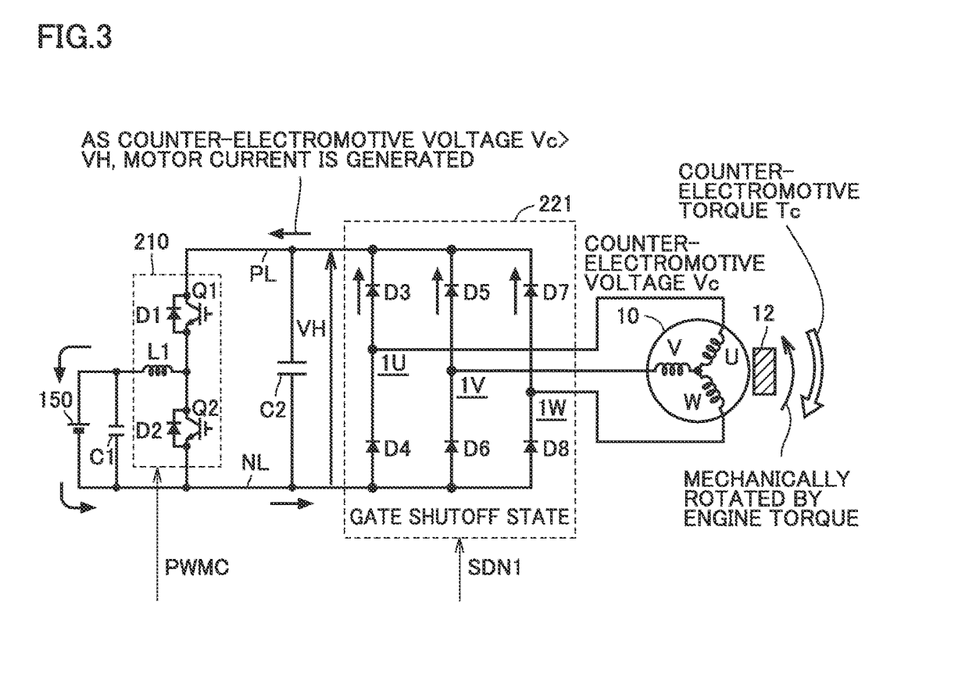
FIG. 3 is a diagram schematically illustrating an operation state of the electrical system during inverter-less running.

FIG. 3 is a diagram schematically illustrating an operation state of the electrical system during the inverter-less running control. With reference to FIG. 3, during the inverter-less running control, in response to gate shutoff signal SDN1 from ECU 300, all switching elements Q3 to Q8 included in inverter 221 are turned into the non-conductive state. Therefore, diodes D3 to D8 included in inverter 221 form a three-phase full-wave rectifier circuit. Similarly, in response to gate-off signal SDN2, all switching elements Q9 to Q14 (see FIG. 2) included in inverter 222 are turned into the non-conductive state. Therefore, diodes D9 to D14 included in inverter 222 form a three-phase full-wave rectifier circuit. On the other hand, switching elements Q1 and Q2 included in converter 210 continue to perform the switching operation in response to control signal PWMC from ECU 300.

Since the inverter-less running is driven by engine 100, engine 100 outputs engine torque Te, and motor generator 10 is mechanically (dynamically) rotated by this engine torque Te. Since motor generator 10 is a permanent magnet synchronous motor, the rotor of motor generator 10 is provided with permanent magnets 12. Thus, permanent magnets 12 provided in the rotor of motor generator 10 are rotated by engine torque Te, and thereby generates a counter-electromotive voltage Vc. When counter-electromotive voltage Vc exceeds system voltage VH, a motor current MCRT1 will flow from motor generator 10 to battery 150 while generating electrical power in motor generator 10, and thereby, a counter-electromotive torque Tc will be generated in motor generator 10, acting to inhibit the rotation of motor generator 10.

Figure 4:
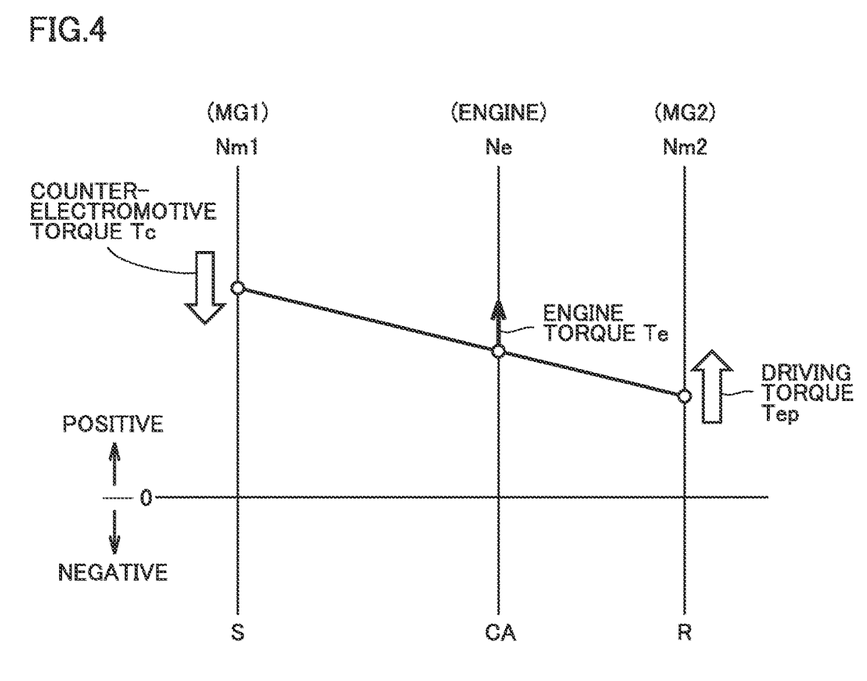
FIG. 4 is a nomogram illustrating the behavior of each rotating element during the inverter-less running control.

FIG. 4 is a nomogram illustrating the behavior of each rotating element during the inverter-less running control. With reference to FIGS. 1 and 4, in planetary gear mechanism 30 configured as described with reference to FIG. 1, the rotation speed of sun gear S (which is equal to MG1 rotation speed Nm1), the rotation speed of carrier CA (which is equal to engine speed Ne) and the rotation speed of ring gear R (which is equal to MG2 rotation speed Nm2) have a linear relationship in the nomogram.

During the inverter-less running, engine torque Te is output from engine 100. When motor generator 10 is mechanically rotated by engine torque Te, it produces counter-electromotive voltage Vc. Accordingly, motor generator 10 generates counter-electromotive torque Tc acting in a direction (negative direction) that inhibits the rotation of motor generator 10. As counter-electromotive torque Tc is applied from motor generator 10 to sun gear S, a driving torque Tep is generated in ring gear R as a reaction of counter-electromotive torque Tc, acting in a positive direction. Thus, Vehicle 1 is driven by driving torque Tep to perform the limp-home running.

Figure 5:
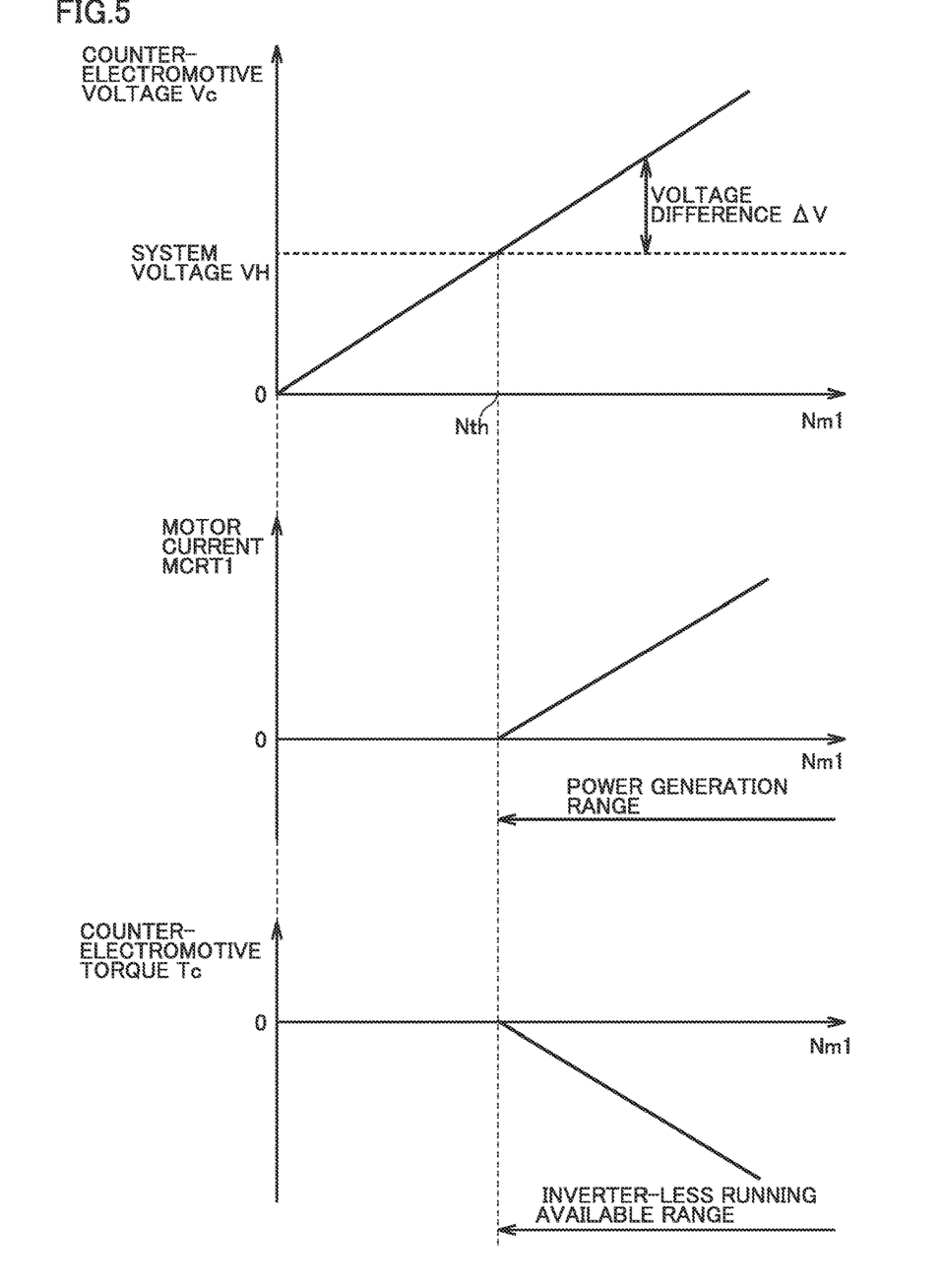
FIG. 5 is a diagram schematically illustrating the relationship between the rotation speed of a first motor generator and a counter-electromotive voltage and a system voltage, the relationship between the rotation speed and a motor current, and the relationship between the rotation speed and a counter-electromotive torque.

The relationship between MG1 rotation speed Nm1 and system voltage VH and counter-electromotive voltage Vc, the relationship between MG1 rotation speed Nm1 and motor current MCRT1, and the relationship between MG1 rotation speed Nm1 and counter-electromotive torque Tc will be described below.

Figure 6:
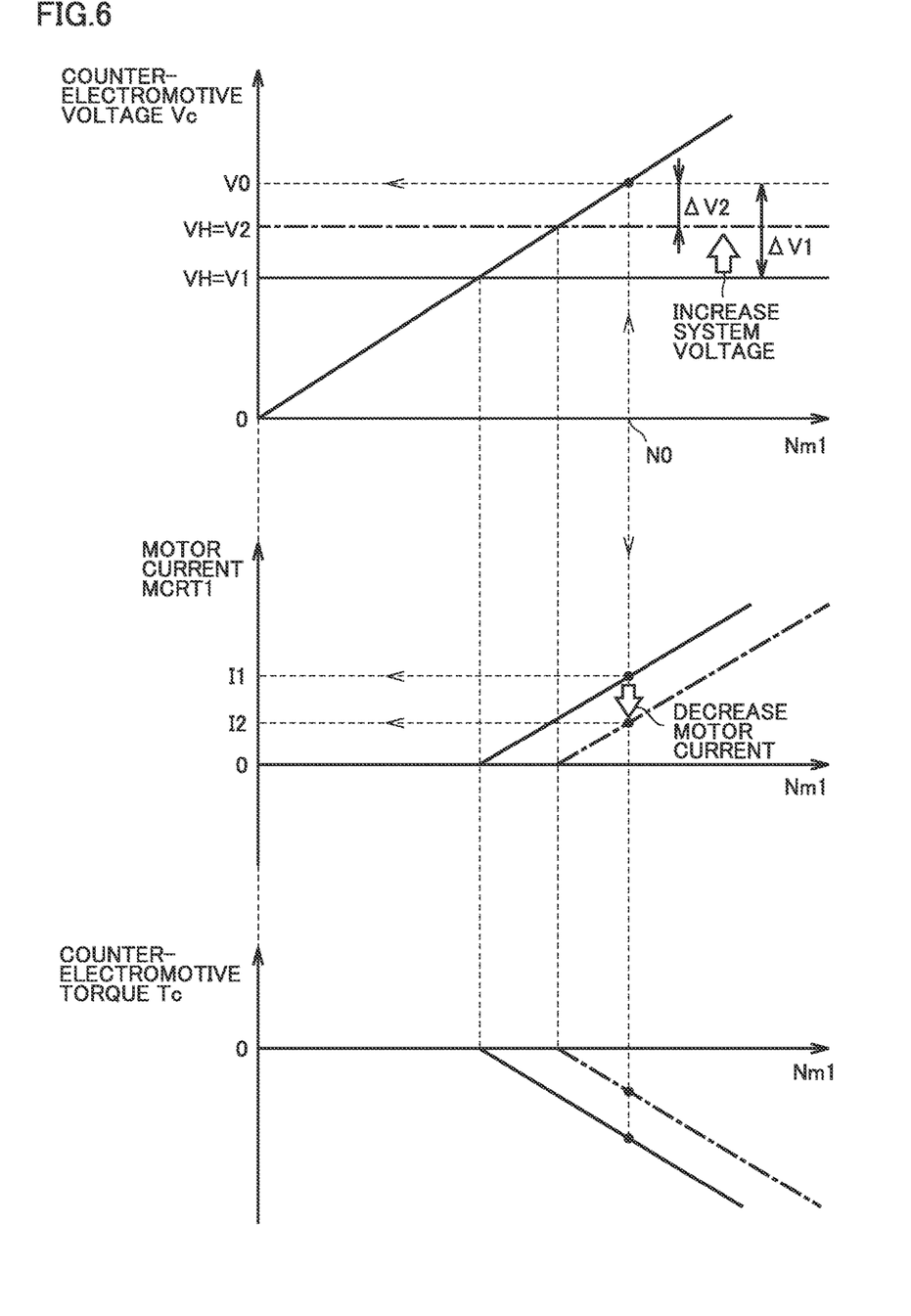
FIG. 6 is a diagram illustrating a control performed to reduce the voltage difference according to the first embodiment of the present disclosure.
Figure 10:
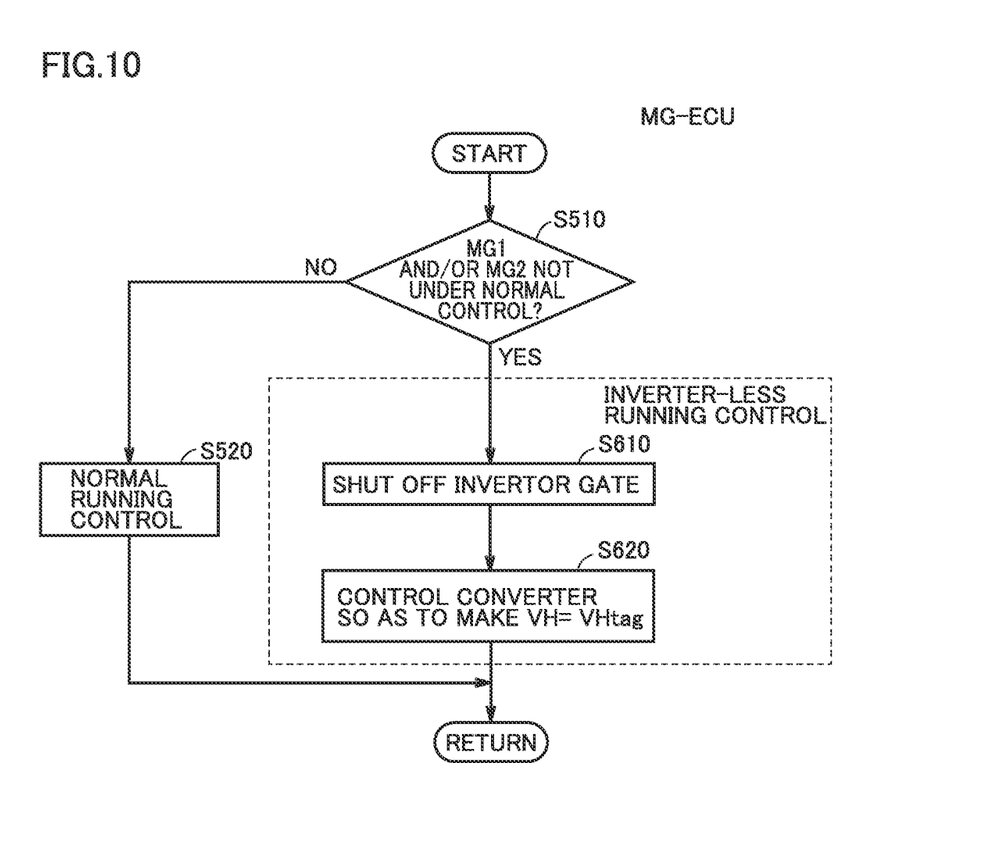
FIG. 10 is a flowchart illustrating a control performed by MG-ECU in the hybrid vehicle according to the second embodiment of the present disclosure.

FIG. 5 is a diagram schematically illustrating the relationship between MG1 rotation speed Nm1 and system voltage VH and counter-electromotive voltage Vc, the relationship between MG1 rotation speed Nm1 and motor current MCRT1, and the relationship between MG1 rotation speed Nm1 and counter-electromotive torque Tc. In FIG. 5 and FIGS. 6 and 10 which will be described later, the horizontal axis represents MG1 rotation speed Nm1. The vertical axis represents counter-electromotive voltage Vc, motor current MCRT1 and counter-electromotive torque Tc from the top to the bottom.

As illustrated in FIG. 5, counter-electromotive voltage Vc increases as MG1 rotation speed Nm1 becomes higher. In a range where MG1 rotation speed Nm1 is lower than a predetermined value Nth, since counter-electromotive voltage Vc is less than system voltage VH, in other words, the voltage difference $\Delta V$ (=Vc−VH) between counter-electromotive voltage Vc and system voltage VH is negative, no motor current MCRT1 will be generated to flow from motor generator 10 to battery 150. Therefore, no counter-electromotive torque Tc will be generated.

On the other hand, in a range where MG1 rotation speed Nm1 exceeds predetermined value Nth, since counter-electromotive voltage Vc is greater than system voltage VH, the voltage difference $\Delta V$ is positive, and thereby, motor current MCRT1 will be generated accordingly. As the voltage difference $\Delta V$ becomes greater, motor current MCRT1 becomes greater. Accordingly, counter-electromotive torque Tc is produced in motor generator 10. Thus, motor generator 10 generates electrical power and counter-electromotive torque Tc in response to the voltage difference $\Delta V$.

In the range of MG1 rotation speed Nm1 illustrated in FIG. 5, as MG1 rotation speed Nm1 increases, counter-electromotive torque Tc monotonically decreases along with the increasing of MG1 rotation speed Nm1. However, in the other range of MG1 rotation speed Nm1, as MG1 rotation speed Nm1 increases, counter-electromotive, torque Tc may increase along with the increasing of MG1 rotation speed Nm1.

During the inverter-less running, the voltage difference $\Delta V$ is maintained positive so as to generate counter-electromotive torque Tc, and thereby, motor generator 10 constantly performs power generation. Therefore, the Joule heat (calorific heat) is generated in motor generator 10. If MG1 temperature TH1 is excessively increased due to the heat generation, in order to protect motor generator 10, the inverter-less running should be interrupted. Thus, in the inverter-less running, the available inverter-less running distance (i.e. the limp-home running distance) will be shortened due to the heat generated in motor generator 10.

Therefore, according to the present embodiment, during the inverter-less running control, when MG1 temperature TH1 is equal to or greater than a predetermined value Tp, compared with the case where MG1 temperature TH1 is less than predetermined value Tp, the voltage difference $\Delta V$ is controlled smaller so as to reduce the heat generated in motor generator 10. When counter-electromotive voltage Vc is higher than system voltage VH (i.e., the voltage difference $\Delta V$ is positive), as the voltage difference $\Delta V$ becomes greater, motor current MCRT1 increases accordingly. Therefore, the greater the voltage difference $\Delta V$ is, the greater the Joule heat generated by motor generator 10 will be. Thus, in the first embodiment, converter 210 is controlled to increase system voltage VH so as to reduce the voltage difference $\Delta V$.

FIG. 6 is a diagram illustrating a control performed to reduce the voltage difference $\Delta V$ according to the first embodiment of the present disclosure. In FIG. 6, as system voltage VH=V1, motor current MCRT1 and counter-electromotive torque Tc are drawn in solid line, and as system voltage VH=V2, motor current MCRT1 and counter-electromotive torque Tc are drawn in dot-chain line.

With reference to FIG. 6, as MG1 rotation speed Nm1=N0 and counter-electromotive voltage Vc=V0, if system voltage VH is increased from V1 to V2, the voltage difference ΔV decreases from ΔV1 to ΔV2, and motor current MCRT1 decreases from I1 to I2. In other words, the power generated by motor generator 10 is reduced. Since the heat generated in motor generator 10 is reduced, it is possible to prevent MG1 temperature TH1 from rising excessively. As a result, it is possible to elongate the limp-home running distance of vehicle 1.

Figure 7:
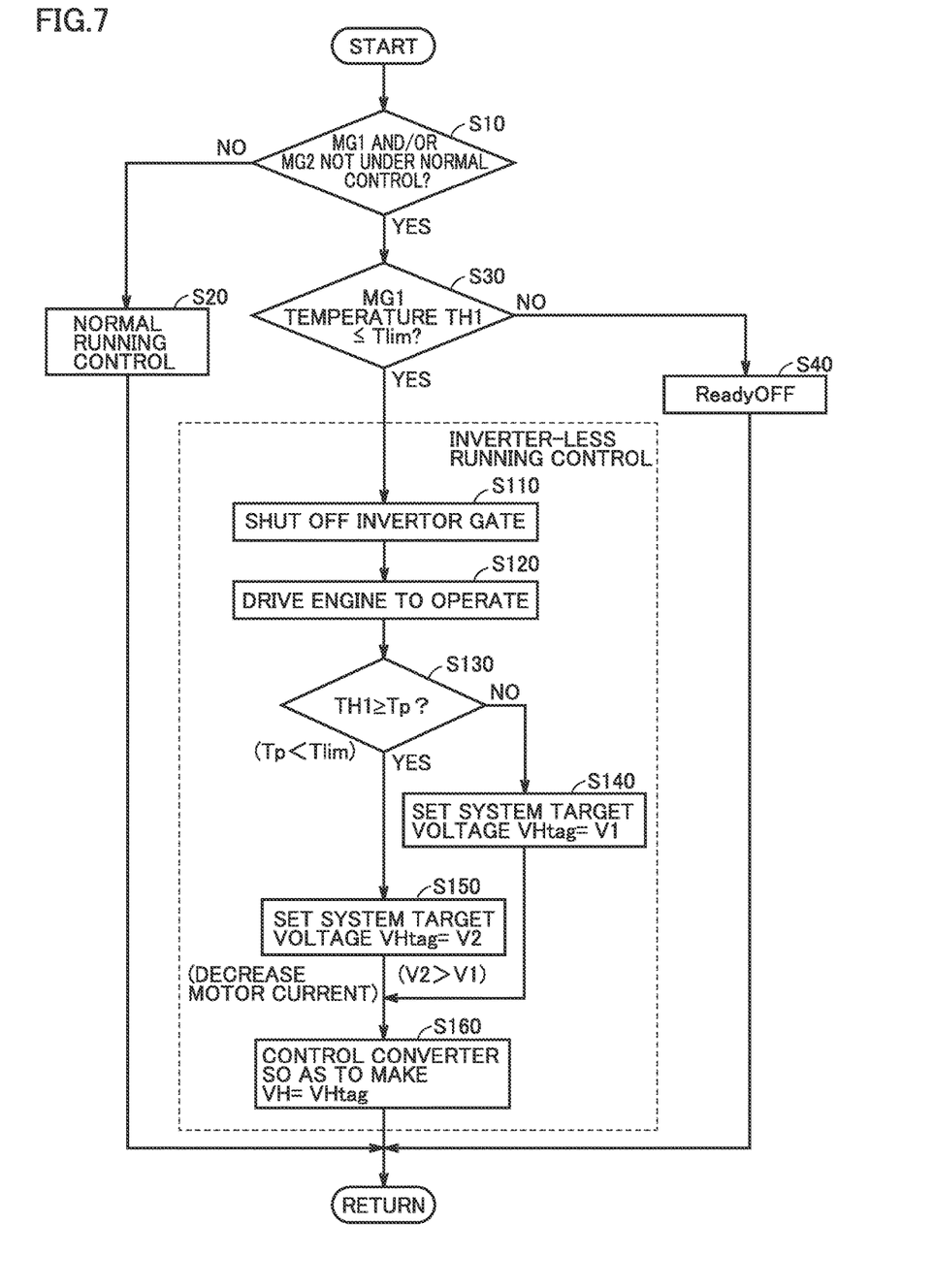
FIG. 7 is a flowchart illustrating a running control performed in a hybrid vehicle according to the first embodiment of the present disclosure.

FIG. 7 is a flowchart illustrating a running control performed in vehicle 1 according to the first embodiment of the present disclosure. The flowchart illustrated in FIG. 7 and in FIGS. 9 and 10 (to be described later) will be invoked and executed from a main routine every time when a predetermined condition is satisfied or when a predetermined period of time passes. It should be noted that each step (hereinafter abbreviated as S) in the flowchart is basically implemented by ECU 300 through software processing, each step may be implemented through hardware processing by using an electronic circuit fabricated in ECU 300.

With reference to FIGS. 1, 2 and 7, at S10, ECU 300 determines whether or not at least one of motor generators 10 and 20 is not under normal control. When both of motor generators 10 and 20 are under normal control (NO at S10), ECU 300 sets the control mode of vehicle 1 to the normal mode so as to cause vehicle 1 to perform the normal running (S20). ECU 300 may use for example a flag to manage the state whether or not motor generators 10 and 20 are under normal control by inverters 221 and 222.

When at least one of motor generators 10 and 20 is not under normal control (YES at S10), ECU 300 determines whether or not MG1 temperature TH1 is equal to or less than an upper limit value (first predetermined value) Tlim of the temperature range that permits the operation of motor generator 10 (S30). When MG1 temperature TH1 is greater than upper limit value Thin (NO at S30), ECU 300 determines that the inverter-less running cannot be continued in order to protect motor generator 10, and thereby shifts vehicle 1 to non-running state (the so-called Ready-OFF state) (S40). In other words, when vehicle 1 is already in inverter-less running, the inverter-less running control is interrupted and vehicle 1 is shifted to the Ready-OFF state. When vehicle 1 is not in inverter-less running, vehicle 1 is shifted to the Ready-OFF state without performing the inverter-less running control.

On the other hand, when MG1 temperature TH1 is less than upper limit value Tlim (YES at S30), ECU 300 performs the inverter-less running control in the subsequent steps from S110 to S160.

At S110, ECU 300 switches inverters 221 and 222 into the gate shutoff state (when the flag is on, the inverters 221 and 222 are kept at the gate shutoff state). At S120, ECU 300 drives engine 100 to operate (or maintains engine 100 at operation state). As described with reference to FIG. 4, as motor generator 10 is mechanically rotated by engine torque Te, counter-electromotive torque Tc is generated from motor generator 10. Thus, driving torque Tep is produced as a reaction force of counter-electromotive torque Tc, acting in a positive direction, and Vehicle 1 is driven by driving torque Tep to perform the inverter-less running. Meanwhile, heat is generated in motor generator 10, and thereby, MG1 temperature TH1 may increase.

At S130, ECU 300 detects MG1 temperature TH1 by using temperature sensor 431, and determines whether or not the detected MG1 temperature TH1 is equal to or greater than predetermined value (second predetermined value) Tp. Predetermined value Tp is smaller than upper limit value Tlim of the allowable temperature range of motor generator 10 (i.e., Tp<Tlim).

When MG1 temperature TH1 is less than predetermined value Tp (NO at S130), ECU 300 proceeds the procedure to S140, and sets system target voltage VHtag to V1. In contrast, when MG1 temperature TH1 is equal to or higher than predetermined value Tp (YES at S130), ECU 300 proceeds the procedure to S150, and sets system target voltage VHtag V2 which is higher than V1 (V2>V1).

At S160, ECU 300 controls converter 210 so as to approach system voltage VH to system target voltage VHtag. After the process of S160 is completed, ECU 300 returns the procedure to the main routine.

As described in the above, according to the first embodiment, when MG1 temperature TH1 is equal to or higher than predetermined value Tp, system voltage VH (=V2) is adjusted greater than system voltage VH (=V1) when MG1 temperature TH1 is less than predetermined value Tp. Compared with the case where system voltage VH is adjusted lower, adjusting system voltage VH higher can reduce the voltage difference ΔV between counter-electromotive voltage Vc and system voltage VH, and consequently reduce motor current MCRT1 flowing from motor generator 10 to battery 150. In other words, since the electric power generated by motor generator 10 is reduced, the heat generation in motor generator 10 is reduced accordingly. Thus, the excessive increase of MG1 temperature TH1 is suppressed. As a result, MG1 temperature TH1 is kept not greater than upper limit value Tlim, which makes it possible to elongate the limp-home running distance of vehicle 1.

In general, compared with the control on the rotation speed of a motor generator (to be described later in detail), the current control using a converter can be performed with high accuracy. Therefore, according to the first embodiment, it is possible to control the heat generation in motor generator 10 with high accuracy.

Second Embodiment

The first embodiment describes such a technique that converter 210 is controlled to increase system voltage VH so as to reduce the voltage difference ΔV, but the technique for reducing the voltage difference ΔV is not limited thereto. In the second embodiment, another technique will be described that engine 100 is controlled to reduce MG1 rotation speed Nm1 so as to reduce the voltage difference ΔV. Since the overall configuration of vehicle 2 (not shown) and the configuration of the electrical system according to the second embodiment is equivalent to the overall configuration of vehicle 1 (see FIG. 1) and the configuration of the electrical system (see FIG. 2) according to the first embodiment, the description thereof will not be repeated.

Figure 8:
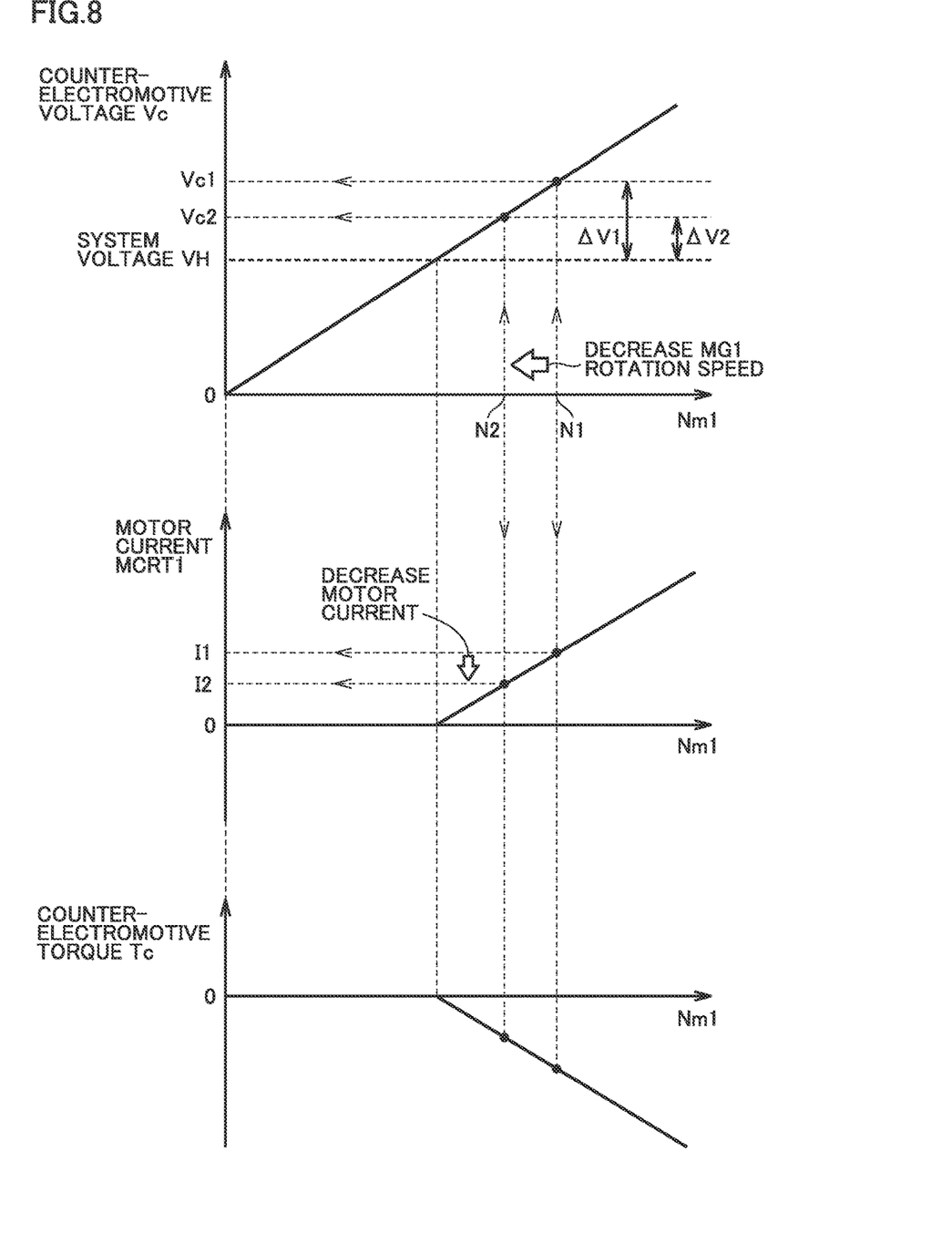
FIG. 8 is a diagram illustrating a control performed to reduce the voltage difference according to a second embodiment of the present disclosure.

FIG. 8 is a diagram illustrating a control performed to reduce the voltage difference ΔV according to the second embodiment of the present disclosure. With reference to FIG. 8, as MG1 rotation speed Nm1 is reduced from N1 to N2, counter-electromotive voltage Vc decreases from Vc1 to Vc2, and thereby, the voltage difference ΔV also decreases from ΔV1 to ΔV2. Accordingly, motor current MCRT1 decreases from I1 to I2. In other words, the power generated by motor generator 10 is reduced. Thereby, the heat generation in motor generator 10 is reduced, which makes it possible to prevent MG1 temperature TH1 from rising excessively. As a result, it is possible to elongate the limp-home running distance of vehicle 2.

Figure 9:
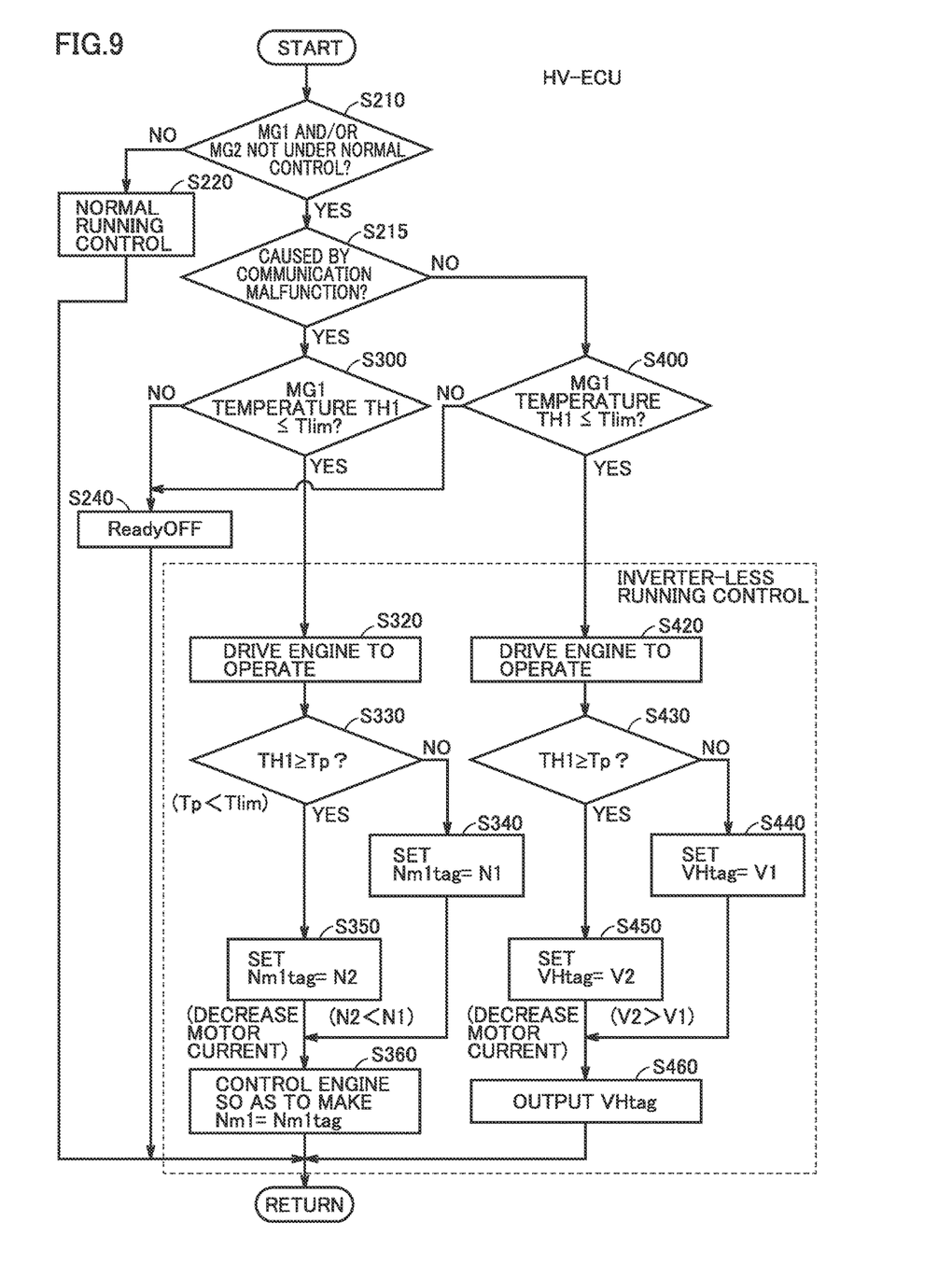
FIG. 9 is a flowchart illustrating a control performed by HV-ECU in the hybrid vehicle according to the second embodiment of the present disclosure.

In the second embodiment, the inverter-less running control will be described in detail when a communication malfunction has occurred between HV-ECU 310 and MG-ECU 320. FIG. 9 illustrates a series of processes performed by HV-ECU 310, and FIG. 10 illustrates a series of processes performed by MG-ECU 320.

FIG. 9 is a flowchart illustrating a control performed by HV-ECU 310 in vehicle 2 according to the second embodiment of the present disclosure. With reference to FIGS. 1, 2 and 9, the process of S210 and the process of S220 are respectively equivalent to the process of S10 and the process of S20 in FIG. 7, the description thereof will not be repeated.

When at least one of motor generator 10 and 20 is not under normal control (YES at S210), HV-ECU 310 determines whether or not it is caused by the communication malfunction (whether the communication is normal or abnormal) (S 215).

When a communication malfunction is not present (NO at S215), HV-ECU 310 determines whether or not MG1 temperature TH1 is equal to or less than upper limit value Tlim of the allowable temperature range (S400). If MG1 temperature TH1 is greater than upper limit value Tlim (NO at S400), vehicle 2 is shifted to the Ready-OFF state (S240).

On the other hand, if MG1 temperature TH1 is equal to or less than upper limit value Tlim (YES at S400), HV-ECU 310 performs an inverter-less running control under normal communication in the subsequent steps of S420 to S460. The process of S420 to S460 is equivalent to that of S120 to S160 in FIG. 7, the description thereof will not be repeated.

When a communication malfunction is present (YES at S215), HV-ECU 310 determines whether or not MG1 temperature TH1 is equal to or less than upper limit value Tlim (S300). If MG1 temperature TH1 is greater than upper limit value Tlim (NO at S300), vehicle 2 is shifted to the Ready-OFF state (S240).

On the other hand, if MG1 temperature TH1 is equal to or less than upper limit value Tlim (YES at S300), HV-ECU 310 performs an inverter-less running control under abnormal communication in the subsequent steps of S320 to S360.

At S320, HV-ECU 310 drives engine 100 to operate (or maintains engine 100 at operation state). This process is the same as the process at S120 in FIG. 7, the description thereof will not be repeated.

At S330, HV-ECU 310 determines whether or not MG1 temperature TH1 is equal to or greater than predetermined value Tp. If MG1 temperature TH1 is less than predetermined value Tp (NO at S330), HV-ECU 310 proceeds the procedure to S340, and sets MG1 target rotation speed Nm1 tag to N1. In contrast, if MG1 temperature TH1 is equal to or greater than predetermined value Tp (YES at S330), HV-ECU 310 procedes the procedure to S350, and sets MG1 target rotation speed Nm1tag to N2 which is smaller than N1 (i.e., N2<N1).

At S360, HV-ECU 310 controls engine 100 so as to approach MG1 rotation speed Nm1 to MG1 target rotation speed Nm1 tag. More specifically, HV-ECU 310 firstly assumes that MG2 rotation speed Nm2 (in other words, the vehicle speed) is maintained unchanged from the current value, and then, based on MG1 target rotation speed Nm1tag and the current value of MG2 rotation speed Nm2, calculates target engine rotation speed Netag from the nomogram relationship (see FIG. 4). Then, HV-ECU 310 outputs an engine required power Pe* to engine-ECU 330 in response to the calculated target engine speed Netag. After the process of S360 is completed, HV-ECU 310 returns the procedure to the main routine.

FIG. 10 is a flowchart illustrating a control performed by MG-ECU 320 in vehicle 2 according to the second embodiment of the present disclosure. With reference to FIGS. 1, 2 and 10, at S510, MG-ECU 320 determines whether or not at least one of motor generator 10 and 20 is not under normal control. When both motor generators 10 and 20 are under normal control (NO at S510), MG-ECU 510 controls converter 210 and inverters 221 and 222 in the same manner as in the case of the normal running (S520).

When at least one of motor generator 10 and 20 is not under normal control (YES at S510), MG-ECU 320 switches inverters 221 and 222 to the gate shutoff state even without receiving a gate shutoff command from HV-ECU 310 (S610).

At S620, MG-ECU 320 controls converter 210 so as to approach system voltage VH to system target voltage VHtag. More specifically, when a communication malfunction is not present, MG-ECU 320 can receive target system voltage VHtag from HV-ECU 310. On the other hand, when a communication malfunction is present, since system target voltage VHtag cannot be updated, MG-ECU 320 may use a fixed value (for example, a predetermined voltage value, or a voltage value received from HV-ECU 310 before the communication malfunction occurs) as system target voltage VHtag. After the process of S620 is completed, MG-ECU 320 returns the procedure to the main routine.

As described in the above, according to the second embodiment, when MG1 temperature TH1 is equal to or higher than predetermined value Tp, MG1 rotation speed Nm1 (=N2) is set lower than MG1 rotation speed Nm1 N1) when MG1 temperature TH1 is less than predetermined value Tp. Since MG1 rotation speed Nm1 is set lower, compared with the case where MG1 rotation speed Nm1 is set higher, counter-electromotive voltage Vc becomes lower, and thereby, the voltage difference ΔV between counter-electromotive voltage Vc and system voltage VH is smaller. Therefore, motor current MCRT1 flowing from motor generator 10 to battery 150 is reduced. In other words, since the power generated by motor generator 10 is reduced, the heat generated in motor generator 10 is reduced. Thus, MG1 temperature TH1 is prevented from rising excessively. As a result, MG1 temperature TH1 is kept lower than upper limit value Tlim, which makes it possible to elongate the limp-home running distance of vehicle 2.

When a communication malfunction is present between HV-ECU 310 and MG-ECU 320, according to the first embodiment, it is impossible to transmit system target voltage VHtag from HV-ECU 310 to MG-ECU 320. Consequently, it is impossible for MG-ECU 320 to control system voltage VH so as to follow system target voltage VHtag. In this regarding, according to the second embodiment, even when a communication malfunction is present, inverters 221 and 222 can be brought into the gate shutoff state (see S320) by MG-ECU 320, and MG1 rotation speed can be reduced by HV-ECU 310 (and engine-ECU 330). Accordingly, motor generator 10 can be protected more reliably.

The control described in the first and the control described in the second embodiment may be combined together. For example, even when no communication malfunction is present between HV-ECU 310 and MG-ECU 320, in the case MG1 temperature TH1 is equal to or higher than predetermined value Tp, system voltage VH may be increased and MG1 rotation speed Nm1 may be decreased compared the case where MG1 temperature TH1 is less than predetermined value Tp so as to reduce the voltage difference ΔV.

In the second embodiment, HV-ECU 310 and engine-ECU 330 constitute the "first control unit" according to the present disclosure. MG-ECU 320 constitutes the "second control unit" according to the present disclosure.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A hybrid vehicle comprising:
an engine;
a first rotating electrical machine including a rotor provided with a permanent magnet;
an output shaft coupled to drive wheels;
a planetary gear mechanism mechanically coupled to the engine, the first rotating electrical machine and the output shaft, and configured to transmit torque among the engine, the first rotating electrical machine and the output shaft;
a second rotating electrical machine coupled to the output shaft;
a battery;
a converter configured to boost a voltage from the battery and output the boosted voltage;
an inverter configured to perform a power conversion between the converter and the first rotating electrical machine and between the converter and the second rotating electrical machine; and
a control device configured to perform an inverter-less running control when at least one of the first rotating electrical machine and the second rotating electrical machine is not under normal control and when a temperature of the first rotating electrical machine is less than a first predetermined value,
the inverter-less running control being such a control that the inverter is brought into a gate shutoff state, and the engine is driven to cause the first rotating electrical machine to generate a braking torque due to a counter-electromotive voltage generated by the first rotating electrical machine, and thereby causing the hybrid vehicle to run with a torque which acts on the output shaft as a counterforce of the braking torque, and
during the inverter-less running control, the control device being configured to:
set a voltage difference between the counter-electromotive voltage and a voltage of a power line connecting the converter and the inverter to a first voltage difference when the temperature of the first rotating electrical machine is equal to or greater than a second predetermined value which is smaller than the first predetermined value; and
set the voltage difference to a second voltage difference when the temperature of the first rotating electrical machine is less than the second predetermined value, the first voltage difference being smaller than the second voltage difference.

2. The hybrid vehicle according to claim 1, wherein
the control device is configured to reduce the voltage difference between the counter-electromotive voltage and the voltage of the power line by controlling the converter to increase the voltage of the power line.

3. The hybrid vehicle according to claim 1, wherein
the control device includes a first control unit configured to detect the temperature of the first rotating electrical machine and control the engine, and a second control unit configured to control the converter,
when the inverter-less running control is performed and when a communication malfunction is present between the first control unit and the second control unit, the first control unit is configured to reduce the voltage difference between the counter-electromotive voltage and the voltage of the power line by controlling the engine to reduce a rotation speed of the first rotating electrical machine from a first rotation speed to a second rotation speed, the first rotation speed being a speed when the temperature of the first rotating electrical machine is equal to or greater than the second predetermined value, the second rotation speed being a speed when the temperature of the first rotating machine is less than the second predetermined value.

* * * * *

UNITED STATES PATENT AND TRADEMARK OFFICE
CERTIFICATE OF CORRECTION

PATENT NO. : 10,005,454 B2
APPLICATION NO. : 15/274230
DATED : June 26, 2018
INVENTOR(S) : Mitsuhiro Matsumura et al.

It is certified that error appears in the above-identified patent and that said Letters Patent is hereby corrected as shown below:

In the Specification

In Column 6, Line 49, after "namely the voltage" delete "VU" and insert --VH--, therefor.

In Column 11, Line 35, after "upper limit value" delete "Thin" and insert --Tlim--, therefor.

In Column 14, Line 30, after "MG1 rotation speed" delete "Nm1 N1)" and insert --Nm1 (= N1)--, therefor.

Signed and Sealed this
Twenty-eighth Day of May, 2019

Andrei Iancu
*Director of the United States Patent and Trademark Office*